United States Patent
Yamasaki et al.

(10) Patent No.: US 12,117,069 B2
(45) Date of Patent: Oct. 15, 2024

(54) LINEAR MOTION DEVICE

(71) Applicant: FANUC CORPORATION, Minamitsuru-gun (JP)

(72) Inventors: Mizuho Yamasaki, Yamanashi-ken (JP); Hisanori Kouda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/021,327

(22) PCT Filed: Aug. 16, 2021

(86) PCT No.: PCT/JP2021/029854
§ 371 (c)(1),
(2) Date: Feb. 14, 2023

(87) PCT Pub. No.: WO2022/039117
PCT Pub. Date: Feb. 24, 2022

(65) Prior Publication Data
US 2023/0296164 A1  Sep. 21, 2023

(30) Foreign Application Priority Data

Aug. 21, 2020  (JP) .................. 2020-140129

(51) Int. Cl.
*F16H 25/22* (2006.01)
*F16H 25/20* (2006.01)

(52) U.S. Cl.
CPC ............ *F16H 25/2204* (2013.01); *F16H 2025/2031* (2013.01); *F16H 2025/2075* (2013.01)

(58) Field of Classification Search
CPC ............ F16H 25/2204; F16H 25/2409; F16H 2025/2031; F16H 2025/2075; F16C 35/12; F16C 35/08
USPC ...... 74/89.23, 89.32; 384/54, 119, 215, 443, 384/428
See application file for complete search history.

(56) References Cited

U.S. PATENT DOCUMENTS

| | | | | |
|---|---|---|---|---|
| 6,848,327 | B2 * | 2/2005 | Nagai | F16C 29/063 74/89.33 |
| 11,530,736 | B2 * | 12/2022 | Kish | F16H 1/16 |

FOREIGN PATENT DOCUMENTS

| | | | | |
|---|---|---|---|---|
| CA | 2505207 A1 | * | 11/2005 | ........... B60N 2/0232 |
| DE | 19944690 A1 | * | 4/2000 | ........... B60N 2/0232 |
| DE | 202006014117 U1 | * | 3/2008 | ............ B23Q 5/027 |
| JP | H 05-025024 U | | 4/1993 | |
| JP | H 11-030234 A | | 2/1999 | |

(Continued)

OTHER PUBLICATIONS

International Search Report (ISR) (PCT Form PCT/ISA/210), in PCT/JP2021/029854, dated Oct. 5, 2021.

*Primary Examiner* — T. Scott Fix
(74) *Attorney, Agent, or Firm* — Sughrue Mion, PLLC

(57) ABSTRACT

A linear motion device includes: a bearing mounted to the outer periphery of a ball screw; a nut holder through which the ball screw passes; and a bearing pressing member which is fixed to a motor housing with the ball screw inserted in a through hole and which restricts the movement of the bearing in the motor housing in the axial direction. The bearing pressing member has a cutout portion extending from the inner peripheral surface of the through hole over to the outer peripheral surface of the bearing pressing member in the radial direction.

14 Claims, 4 Drawing Sheets

(56) References Cited

FOREIGN PATENT DOCUMENTS

| | | |
|---|---|---|
| JP | H 11-108142 A | 4/1999 |
| JP | 2002-174317 A | 6/2002 |
| JP | 2010-007762 A | 1/2010 |
| JP | 2015-014317 A | 1/2015 |
| JP | 2017-067197 A | 4/2017 |
| JP | 2019-002461 A | 1/2019 |

* cited by examiner

LINEAR MOTION DEVICE

TECHNICAL FIELD

The present invention relates to a linear motion device including a nut that moves in an axial direction with respect to a ball screw in accordance with rotation of the ball screw.

BACKGROUND ART

Conventionally, there is a linear motion device having a nut that moves in an axial direction with respect to a ball screw in accordance with rotation of the ball screw (for example, JP 2017-067197 A).

SUMMARY OF THE INVENTION

A bearing for supporting the ball screw and a restricting member for restricting movement of the bearing are attached to the ball screw. For maintenance of the linear motion device, an operator may remove the restricting member from the ball screw. In order to remove the restricting member from the ball screw, the operator also needs to remove the bearing from the ball screw. Therefore, maintenance of the linear motion device requires considerable processing steps. Therefore, improvement in work efficiency of maintenance of the linear motion device is required.

The present invention has been devised in order to solve the above problem, and it is therefore an object of the present invention to provide a linear motion device that can improve maintenance work efficiency.

According to an embodiment, there is provided a linear motion device including a ball screw, a nut configured to move with respect to the ball screw in an axial direction thereof in accordance with rotation of the ball screw, a bearing mounted on an outer periphery of the ball screw, a housing configured to support the ball screw through the bearing, a nut holder configured to hold the nut therein and through which the ball screw passes, and a restricting member that has a through hole in a center portion thereof, is disposed between the bearing and the nut holder, is fixed to the housing in a state where the ball screw is inserted into the through hole, and restricts movement of the bearing in the axial direction in the housing, wherein the restricting member includes a cutout portion extending in a radial direction from an inner peripheral surface of the through hole to an outer peripheral surface of the restricting member.

According to the present invention, the work efficiency of maintenance of the linear motion device can be improved.

DETAILED DESCRIPTION OF THE INVENTION

First Embodiment

[Configuration of Linear Motion Device]

Figure 1:
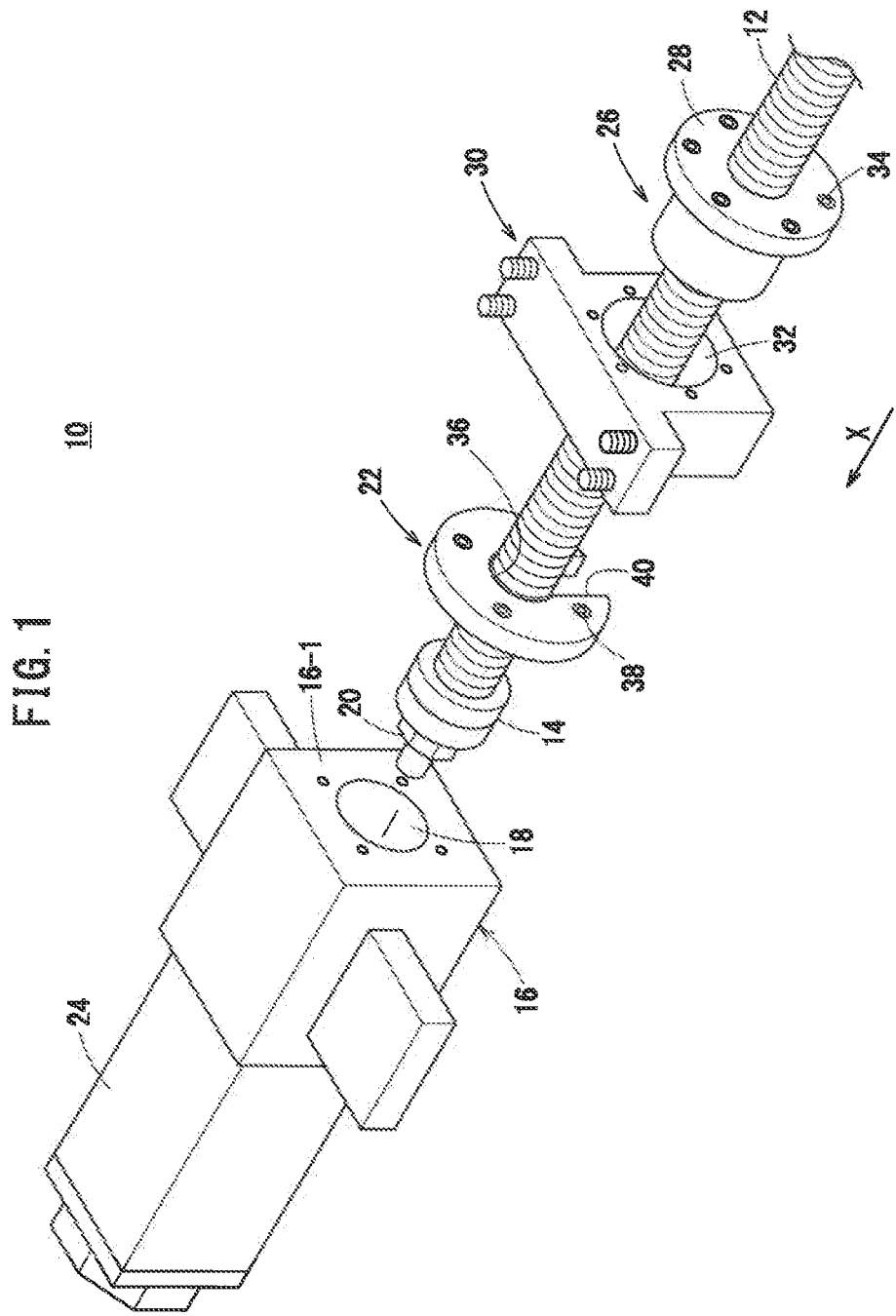
FIG. 1 is an exploded view of a linear motion device.

FIG. 1 is an exploded view of a linear motion device 10 according to the present embodiment. The linear motion device 10 is, for example, a device for linearly moving a work table of a machine tool. The linear motion device 10 includes a ball screw 12, a bearing 14, a motor housing 16, a bearing limiting member 22, a motor 24, a nut 26, and a nut holder 30. Hereinafter, each member constituting the linear motion device 10 will be described using an X-axis shown in FIG. 1. The X-axis direction is parallel to an axial direction of the ball screw 12. An end portion of the ball screw 12 to which the bearing 14 is attached is referred to as a positive side, and an opposite end portion is referred to as a negative side.

The motor housing 16 has a support portion (support hole) 18 bored so as to open in a side surface 16-1 on the negative side in the X-axis direction. The bearing 14 is attached to the end portion of the ball screw 12 on the positive side in the X-axis direction. A lock nut 20 is attached to an end portion of the ball screw 12 on the positive side in the X-axis direction. The lock nut 20 is disposed at a position closer to the end surface of the ball screw 12 on the positive side in the X-axis direction than the bearing 14 is. The bearing 14 is prevented from coming off the ball screw 12 by the lock nut 20. The end portion of the ball screw 12 on the positive side in the X-axis direction is inserted into the support portion 18 together with the bearing 14. The ball screw 12 is supported by the motor housing 16 via the bearing 14. The bearing limiting member 22 is mounted on the ball screw 12. The bearing limiting member 22 is disposed at a position farther from an end surface of the ball screw 12 on the positive side in the X-axis direction than the bearing 14 is. In a state where the ball screw 12 is inserted into the support portion 18 together with the bearing 14, the opening of the support portion 18 is closed by the bearing limiting member 22. The bearing limiting member 22 is fixed to the side surface 16-1 of the motor housing 16 by bolts 38. The bearing limiting member 22 limits movement of the bearing 14 and the ball screw 12 in a direction in which the bearing 14 and the ball screw 12 come out of the support portion 18. The motor housing 16 is fixed to, for example, a bed of a machine tool. The motor housing 16 corresponds to a housing of the present invention.

The end portion of the ball screw 12 on the positive side in the X-axis direction is connected to a drive shaft of the motor 24 inside the motor housing 16. Thus, the ball screw 12 is rotated about its axis by the motor 24. The nut 26 is screwed to the ball screw 12 via balls (not shown). As the ball screw 12 rotates, the nut 26 moves in the X-axis direction with respect to the ball screw 12.

The nut 26 is held by the nut holder 30. The nut holder 30 is provided with a through hole 32 penetrating in the X-axis direction, and the nut 26 is accommodated in the through hole 32. A diameter of the through hole 32 is larger than an outer diameter of the bearing 14. The nut 26 has a flange 28. The flange 28 is formed at an end portion of the nut 26 on the negative side in the X-axis direction. In a state where the nut 26 is accommodated in the through hole 32 of the nut holder 30, the flange 28 is fixed to a side surface of the nut holder 30 on the negative side in the X-axis direction by bolts 34. As a result, the nut holder 30 moves together with the nut 26 in the X-axis direction with respect to the ball screw 12. To the nut holder 30, for example, a work table of a machine tool is fixed. Thus, the work table is linearly moved together with the nut holder 30.

The bearing limiting member 22 is formed in a disk shape having a through hole 36 at a central portion thereof. A diameter of the through hole 36 of the bearing limiting member 22 is formed to be smaller than the outer diameter of the an outer race of the bearing 14 and larger than the outer diameter of an inner race. An outer diameter of the bearing limiting member 22 is formed to be larger than a diameter of the through hole 32 of the nut holder 30. In the bearing limiting member 22, a cutout portion 40 extending in the radial direction from an inner circumferential surface of the through hole 36 to an outer peripheral surface of the bearing limiting member 22 is formed. A width of the cutout portion 40 is smaller than the outer diameter of the ball screw 12. The bearing limiting member 22 corresponds to a restricting member of the present invention.

Figure 2:
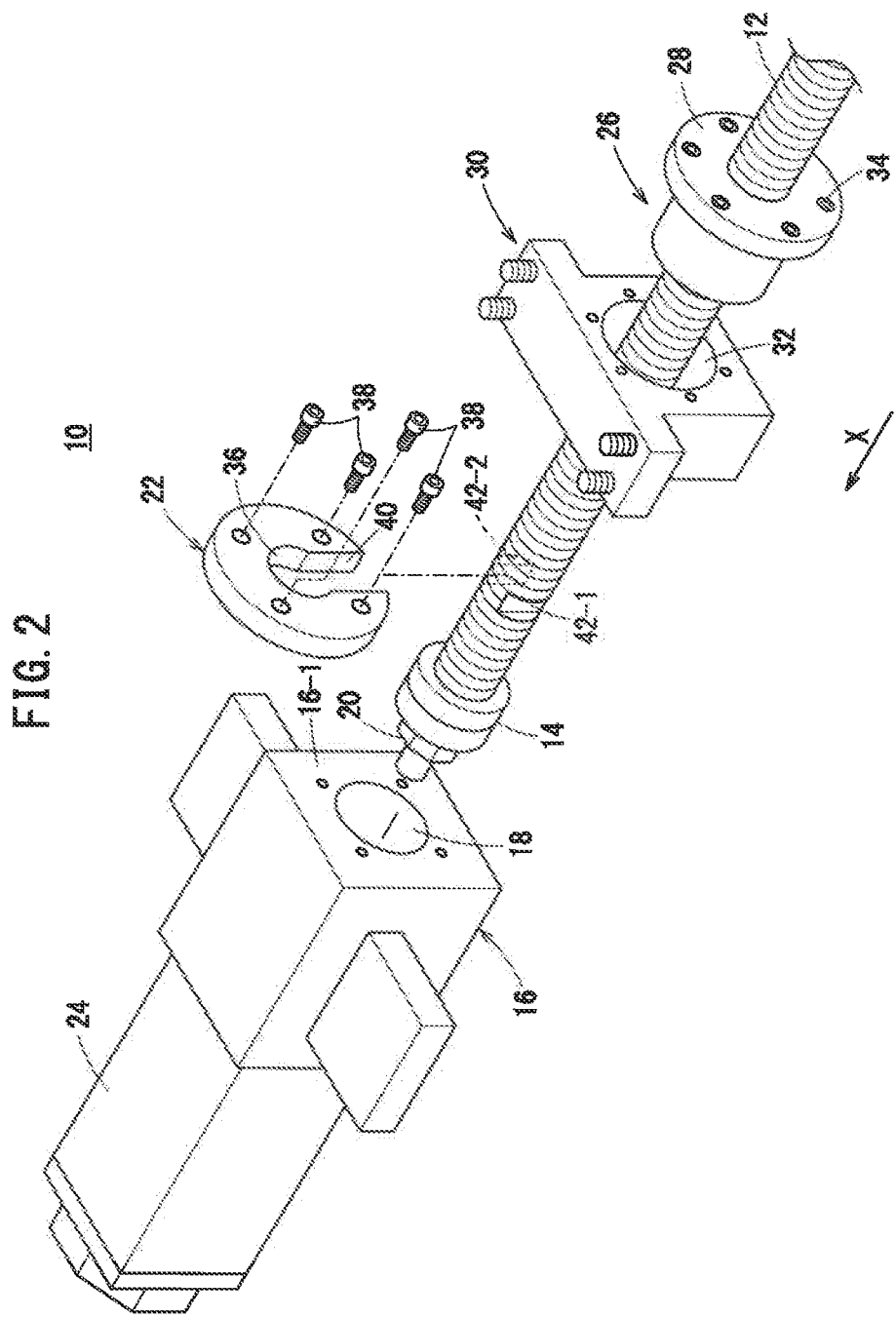
FIG. 2 is a view illustrating a state in which a bearing limiting member is removed from a ball screw.

FIG. 2 is a view showing a state in which the bearing limiting member 22 is removed from the ball screw 12. As shown in FIG. 2, the ball screw 12 has two planar portions 42-1 and 42-2 that are formed by partially cutting out the outer peripheral surface thereof to be parallel to each other. The thickness of a portion of the ball screw 12 sandwiched between the two planar portions 42-1 and 42-2 is formed to be thinner than the width of the cutout portion 40 of the bearing limiting member 22.

The operator pulls out the bearing limiting member 22 from the ball screw 12 along the cutout portion 40 at a position where the planar portions 42-1 and 42-2 are formed on the ball screw 12. Thus, the bearing limiting member 22 can be removed from the ball screw 12. Further, the operator pushes the bearing limiting member 22 into the ball screw 12 along the cutout portion 40 at a position where the planar portions 42-1 and 42-2 are formed in the ball screw 12. Thus, the bearing limiting member 22 can be attached to the ball screw 12.

Operational Effect

Figure 3:
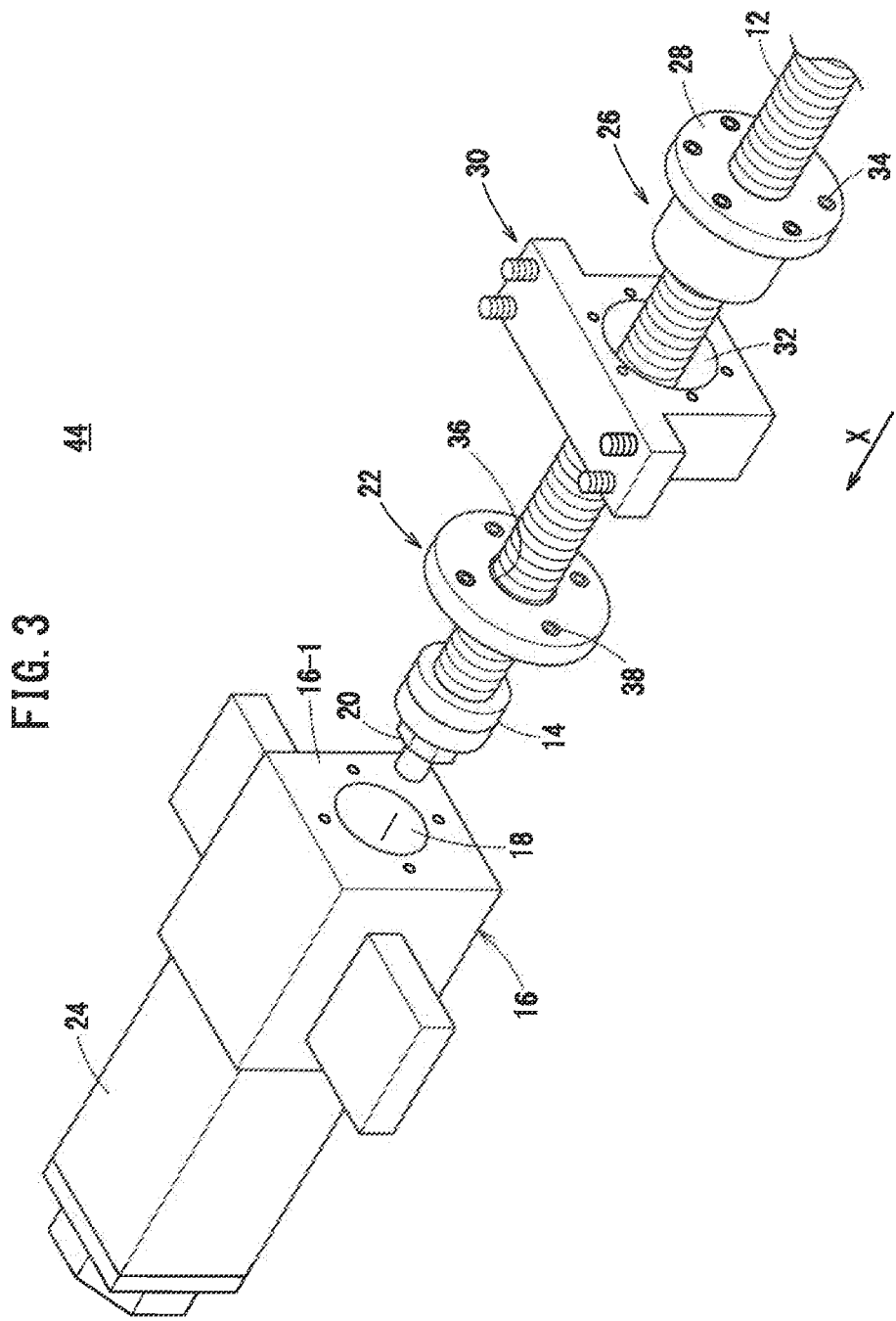
FIG. 3 is an exploded view of a linear motion device of a comparative example.

FIG. 3 is an exploded view of a linear motion device 44 according to a comparative example. The shape of a bearing limiting member 22 of the linear motion device 44 of the comparative example is partially different from the shape of the bearing limiting member 22 of the linear motion device 10 of the present embodiment. The bearing limiting member 22 of the linear motion device 44 of the comparative example does not have a configuration corresponding to the cutout portion 40 of the linear motion device 10 of the present embodiment. The other members of the linear motion device 44 of the comparative example are the same as those of the linear motion device 10 of the present embodiment.

The outer diameter of the bearing limiting member 22 is larger than the diameter of the through hole 32 of the nut holder 30, and the bearing limiting member 22 cannot pass through an inner circumference of the nut holder 30. On the other hand, the outer diameter of the bearing 14 is smaller than the diameter of the through hole 32 of the nut holder 30, so that the bearing 14 can pass through the inner circumference of the nut holder 30.

Therefore, when the linear motion device 44 is disassembled, if the bearing limiting member 22 is removed from the ball screw 12, the operator can pull out the ball screw 12 from the nut holder 30 even if the bearing 14 is attached to the ball screw 12. Similarly, when the linear motion device 44 is assembled, if the bearing limiting member 22 is removed from the ball screw 12, the operator can insert the ball screw 12 into the nut holder 30 even if the bearing 14 is attached to the ball screw 12.

However, in the structure of the linear motion device 44 of the comparative example, when removing the bearing limiting member 22 from the ball screw 12, the operator also needs to remove the bearing 14 from the ball screw 12. Similarly, when attaching the bearing limiting member 22 to the ball screw 12, the operator needs to remove the bearing 14 from the ball screw 12. Since the linear motion device 44 of the comparative example requires considerable processing steps for maintenance, a linear motion device capable of improving work efficiency of maintenance is demanded.

In the linear motion device 10 of the present embodiment, the bearing limiting member 22 has the cutout portion 40. Therefore, in a state where the bearing 14 is attached to the ball screw 12, an operator can remove the bearing limiting member 22 from the ball screw 12. Thus, the operator can pull out the ball screw 12 from the nut holder 30 without removing the bearing 14 from the ball screw 12. Further, the operator can attach the bearing limiting member 22 to the ball screw 12 in a state where the bearing 14 is attached to the ball screw 12. Thus, the operator can insert the ball screw 12 into the nut holder 30 in a state where the bearing 14 is attached to the ball screw 12. Thereafter, the operator can attach the bearing limiting member 22 to the ball screw 12 without removing the bearing 14 from the ball screw 12. Therefore, the maintenance work efficiency of the linear motion device 10 can be improved.

In the linear motion device 10 of the present embodiment, the ball screw 12 has two planar portions 42-1 and 42-2 that are formed by cutting out the outer peripheral surface to be parallel to each other. The width of the cutout portion 40 of the bearing limiting member 22 is formed to be smaller than the outer diameter of the ball screw 12. Thus, the strength of the bearing limiting member 22 can be ensured.

Second Embodiment

Figure 4:
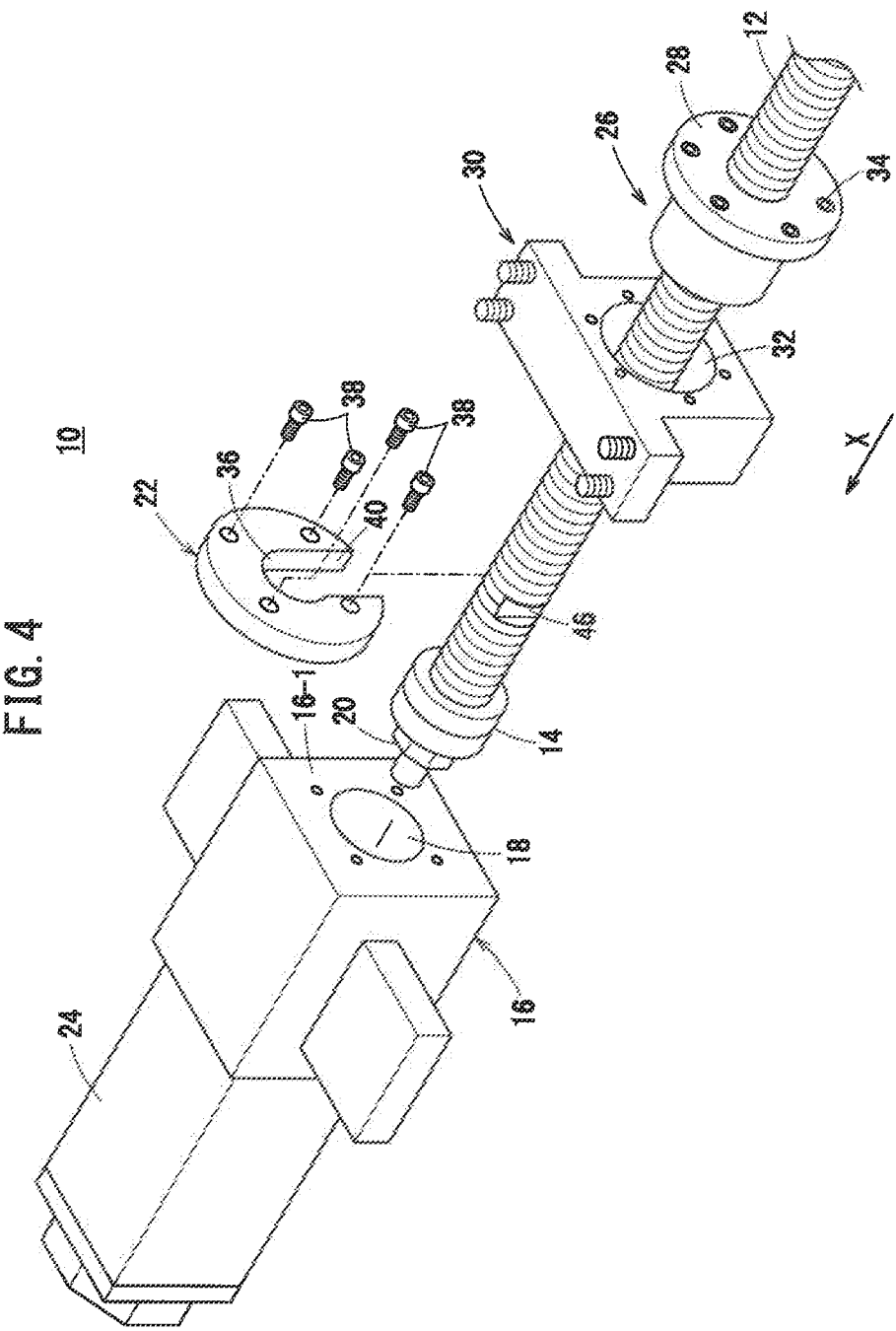
FIG. 4 is a view illustrating a state in which a bearing limiting member is removed from a ball screw.

FIG. 4 is a view illustrating a state in which the bearing limiting member 22 is removed from the ball screw 12. As shown in FIG. 4, the ball screw 12 has one planar portion 46 formed by cutting out a part of the outer peripheral surface thereof. The thickness of the planar portion 46 and the outer peripheral surface of the ball screw 12 is formed to be thinner than the width of the cutout portion 40 of the bearing limiting member 22. The cutout portion 40 shown in FIG. 4 is formed so as to be shifted from the center of the through hole 36. Therefore, the extension line of the center line in the width direction of the cutout portion 40 does not pass through the center of the through hole 36. On the other hand, the cutout portion 40 shown in FIG. 2 is formed so as to extend toward the center of the through hole 36. Therefore, the extension line of the center line in the width direction of the cutout portion 40 passes through the center of the through hole 36. It is adequate that the entire cutout portion 40 communicates with the through hole 36 in the width direction of the cutout portion 40. The cutout portion 40 may be formed to be deviated from the center of the through hole 36 or may be formed to extend toward the center of the through hole 36. The other configurations are the same as those of the linear motion device 10 of the first embodiment.

Operational Effect

In the linear motion device 10 of the present embodiment, the ball screw 12 has the planar portion 46 formed by cutting out a part of the outer peripheral surface of the ball screw 12. The width of the cutout portion 40 of the bearing limiting member 22 is formed to be smaller than the outer diameter of the ball screw 12. In the present embodiment, since one planar portion 46 is formed in the ball screw 12, it is possible to ensure the strength of the bearing limiting member 22 as compared with the case where two planar portions 42-1 and 42-2 of the ball screw 12 are formed as in the first embodiment.

Modifications

The outer diameter of the bearing 14 may be formed smaller than the inner diameter of the nut 26. Accordingly, if the bearing limiting member 22 is removed from the ball screw 12, the operator can pull out the ball screw 12 from the nut 26 in a state where the bearing 14 is attached to the ball screw 12. In a state where the bearing 14 is attached to the ball screw 12, the operator can insert the ball screw 12 into the nut 26. Thereafter, the operator can attach the bearing limiting member 22 to the ball screw 12 without removing the bearing 14 from the ball screw 12.

Technical Concepts Obtainable from the Embodiments

The following is a description of technical concepts that can be understood from the embodiments described above.

The linear motion device (10) includes the ball screw (12), the nut (26) configured to move with respect to the ball screw in the axial direction thereof in accordance with rotation of the ball screw, the bearing (14) mounted on an outer periphery of the ball screw, the housing (16) configured to support the ball screw through the bearing, the nut holder (30) configured to hold the nut therein and through which the ball screw passes, and the restricting member (22) that has the through hole (36) in the center portion thereof, is disposed between the bearing and the nut holder, is fixed to the housing in a state where the ball screw is inserted into the through hole, and restricts movement of the bearing in the axial direction in the housing, wherein the restricting member includes the cutout portion (40) extending in the radial direction from the inner peripheral surface of the through hole to the outer peripheral surface of the restricting member.

In the linear motion device, the ball screw may include the planar portion (42-1, 42-2, 46) formed by cutting out at least a part of the outer peripheral surface of the ball screw.

In the linear motion device, the planar portion of the ball screw may include two planar portions (42-1, 42-2), and the two planar portions may be formed in parallel with each other.

In the linear motion device, the outer diameter of the restricting member may be larger than the inner diameter of the nut holder.

In the linear motion device, the outer diameter of the bearing may be smaller than the inner diameter of the nut holder.

In the linear motion device, the inner diameter of the through hole may be smaller than the outer diameter of the bearing.

In the linear motion device described above, the housing may include the support portion (18) which opens in the side surface (16-1) thereof and into which the ball screw is inserted together with the bearing, and the regulating member may be fixed to the side surface of the housing in which the support portion is opened.

The invention claimed is:

1. A linear motion device comprising:
a ball screw;
a nut configured to move with respect to the ball screw in an axial direction thereof in accordance with rotation of the ball screw;
a bearing mounted on an outer periphery of the ball screw;
a housing configured to support the ball screw through the bearing;
a nut holder configured to hold the nut therein and through which the ball screw passes; and
a restricting member that has a through hole in a center portion thereof, is disposed between the bearing and the nut holder, is fixed to the housing in a state where the ball screw is inserted into the through hole, and restricts movement of the bearing in the axial direction in the housing,
wherein the restricting member includes a cutout portion extending in a radial direction from an inner peripheral surface of the through hole to an outer peripheral surface of the restricting member, and
wherein the ball screw includes a planar portion formed by partially cutting out a part of an outer peripheral surface of the ball screw.

2. The linear motion device according to claim 1, wherein the planar portion of the ball screw comprises two planar portions, and
the two planar portions are formed in parallel with each other.

3. The linear motion device according to claim 1, wherein an outer diameter of the restricting member is larger than an inner diameter of the nut holder.

4. The linear motion device according to claim 1, wherein an outer diameter of the bearing is smaller than an inner diameter of the nut holder.

5. The linear motion device according to claim 1, wherein an inner diameter of the through hole is smaller than an outer diameter of the bearing.

6. The linear motion device according to claim 1, wherein the housing includes a support portion which opens in a side surface thereof and into which the ball screw is inserted together with the bearing, and
wherein the regulating member is fixed to the side surface of the housing in which the support portion is opened.

7. The linear motion device according to claim 1, wherein, in a state where the restricting member is attached to the ball screw, the ball screw is rotatable relative to the restricting member.

8. The linear motion device according to claim 1, wherein the planar portion is sized based on the cutout portion of the restricting member.

9. The linear motion device according to claim 1, wherein the restricting member is configured to be detachable from the housing.

10. The linear motion device according to claim 1, wherein the restricting member is configured to be detachable from the housing while remaining attached to the ball screw.

11. The linear motion device according to claim 1, wherein the restricting member is configured to be detachable from the housing while remaining attached to the ball screw via the planar portion.

12. The linear motion device according to claim 1, wherein the planar portion of the ball screw comprises two planar portions,
wherein the two planar portions are formed in parallel with each other, wherein a width of the cutout portion of the restricting member is less than an outer diameter of the ball screw, and wherein a thickness of a portion of the ball screw sandwiched between the two planar portions is thinner than the width of the cutout portion of the restricting member.

13. The linear motion device according to claim 1, wherein the restricting member is provided separately from the housing and the ball screw.

14. The linear motion device according to claim 7, wherein the housing includes a support portion which opens to a side surface thereof and into which the ball screw is inserted in the axial direction together with the bearing.

* * * * *